(12) United States Patent
Villar et al.

(10) Patent No.: US 10,384,779 B2
(45) Date of Patent: Aug. 20, 2019

(54) SYSTEM AND METHOD FOR COMMANDING A PAYLOAD OF AN AIRCRAFT

(71) Applicant: THE BOEING COMPANY, Chicago, IL (US)

(72) Inventors: Victor Perez Villar, Madrid (ES); Enrique Casado, Madrid (ES); Ivan Maza, Madrid (ES); Fernando Caballero, Madrid (ES)

(73) Assignee: THE BOEING COMPANY, Chicago, IL (US)

( * ) Notice: Subject to any disclaimer, the term of this patent is extended or adjusted under 35 U.S.C. 154(b) by 206 days.

(21) Appl. No.: 14/457,084

(22) Filed: Aug. 11, 2014

(65) Prior Publication Data

US 2015/0251756 A1    Sep. 10, 2015

(30) Foreign Application Priority Data

Nov. 29, 2013    (EP) .................................... 13382486

(51) Int. Cl.
| | | |
|---|---|---|
| *B64C 39/00* | (2006.01) | |
| *B64C 39/02* | (2006.01) | |
| *G05D 1/00* | (2006.01) | |
| *G08G 5/00* | (2006.01) | |
| *G05D 1/08* | (2006.01) | |

(52) U.S. Cl.
CPC ......... *B64C 39/024* (2013.01); *G05D 1/0094* (2013.01); *G05D 1/0808* (2013.01); *G08G 5/0021* (2013.01); *G08G 5/0069* (2013.01); *B64C 2201/12* (2013.01); *B64C 2201/141* (2013.01)

(58) Field of Classification Search
None
See application file for complete search history.

(56) References Cited

U.S. PATENT DOCUMENTS

| | | | | |
|---|---|---|---|---|
| 5,442,556 A | * | 8/1995 | Boyes ................. | G01C 21/005 701/15 |
| 6,161,061 A | * | 12/2000 | Bessacini ............... | F41G 7/306 701/1 |

(Continued)

FOREIGN PATENT DOCUMENTS

| | | |
|---|---|---|
| DE | 102005020594 A1 | 11/2006 |
| EP | 2040137 A1 | 3/2009 |
| EP | 2071353 A2 | 6/2009 |

OTHER PUBLICATIONS

Extended European Search Report dated Aug. 14, 2014, six (6) pages.

(Continued)

*Primary Examiner* — Jonathan M Dager
(74) *Attorney, Agent, or Firm* — Patterson + Sheridan, LLP (57) ABSTRACT

A system and method is provided for commanding a payload of an aircraft. A plurality of flight segments, which comprise trajectory information of the aircraft, are received. A plurality of payload commands are generated using statements of payload intents. Each one of the payload commands are synchronized with at least one of the plurality of flight segments. The system and method express the operations to be performed by the payload onboard in order to achieve the established mission goals of the aircraft.

20 Claims, 4 Drawing Sheets

(56) References Cited

U.S. PATENT DOCUMENTS

| | | | | |
|---|---|---|---|---|
| 6,424,889 B1* | 7/2002 | Bonhoure | G05D 1/0202 | 244/183 |
| 6,535,816 B1* | 3/2003 | Smith | G01S 5/16 | 701/469 |
| 6,822,583 B2* | 11/2004 | Yannone | G01S 11/04 | 340/945 |
| 7,599,765 B2* | 10/2009 | Padan | G08G 5/045 | 701/3 |
| 7,735,781 B1* | 6/2010 | Moritz | B64D 1/06 | 198/371.3 |
| 7,836,965 B2* | 11/2010 | Korenkov | A62C 3/025 | 102/221 |
| 7,970,532 B2* | 6/2011 | Tehan | G05D 1/0646 | 701/23 |
| 8,106,753 B2* | 1/2012 | Vian | G07C 5/008 | 340/438 |
| 8,374,792 B2* | 2/2013 | White | G01C 21/3446 | 701/533 |
| 8,380,362 B2* | 2/2013 | Beavin | G05D 1/0044 | 342/450 |
| 8,527,115 B2* | 9/2013 | Greenfeld | G01C 11/02 | 382/108 |
| 8,542,255 B2* | 9/2013 | Bhatt | H04N 9/8205 | 345/676 |
| 8,543,265 B2* | 9/2013 | Ekhaguere | G05D 1/101 | 701/11 |
| 8,566,027 B2* | 10/2013 | Rosswog | G01C 21/3415 | 701/411 |
| 8,818,572 B1* | 8/2014 | Tofte | B64O 39/024 | 701/2 |
| 8,930,058 B1* | 1/2015 | Quist | G05D 1/0221 | 318/568.13 |
| 9,043,052 B2* | 5/2015 | So | G01C 23/00 | 701/3 |
| 9,064,222 B2* | 6/2015 | Saad | G06Q 10/0631 | |
| 9,262,929 B1* | 2/2016 | Roy | G08G 5/0034 | |
| 9,658,623 B2* | 5/2017 | Navarro | G05D 1/101 | |
| 10,223,921 B2* | 3/2019 | Navarro Felix | G08G 5/0034 | |
| 2002/0161489 A1* | 10/2002 | Johnson | G05D 1/101 | 701/4 |
| 2003/0048357 A1* | 3/2003 | Kain | B64D 47/08 | 348/144 |
| 2003/0167109 A1* | 9/2003 | Clarke | G06Q 10/0631 | 701/3 |
| 2003/0212478 A1* | 11/2003 | Rios | G05D 1/0044 | 701/2 |
| 2005/0004723 A1* | 1/2005 | Duggan | G05D 1/0061 | 701/24 |
| 2005/0004759 A1* | 1/2005 | Siegel | G01S 13/66 | 701/519 |
| 2005/0021202 A1* | 1/2005 | Russell | G01C 11/02 | 348/143 |
| 2005/0072880 A1* | 4/2005 | Nolan | B64D 1/16 | 244/136 |
| 2005/0197749 A1* | 9/2005 | Nichols | G05D 1/0027 | 701/3 |
| 2006/0074557 A1* | 4/2006 | Mulligan | G05D 1/0094 | 701/13 |
| 2006/0089765 A1* | 4/2006 | Pack | G05D 1/0061 | 701/23 |
| 2006/0184292 A1* | 8/2006 | Appleby | F41H 13/00 | 701/23 |
| 2006/0271245 A1* | 11/2006 | Herman | F41G 7/007 | 701/1 |
| 2007/0021879 A1* | 1/2007 | DelNero | G05D 1/0088 | 701/23 |
| 2007/0023582 A1* | 2/2007 | Steele | B64C 39/024 | 244/190 |
| 2007/0040121 A1* | 2/2007 | Kalayeh | G01C 11/025 | 250/342 |
| 2007/0210953 A1* | 9/2007 | Abraham | G08G 5/0069 | 342/29 |
| 2007/0288156 A1* | 12/2007 | Neff | F41G 7/343 | 701/533 |
| 2008/0208397 A1* | 8/2008 | Miklos | G06Q 10/087 | 701/3 |
| 2009/0027253 A1* | 1/2009 | van Tooren | G01S 13/9303 | 342/29 |
| 2009/0065646 A1* | 3/2009 | Hale | A62C 3/0228 | 244/136 |
| 2009/0087029 A1* | 4/2009 | Coleman | G06K 9/00208 | 382/103 |
| 2009/0157233 A1* | 6/2009 | Kokkeby | G01S 3/7864 | 701/3 |
| 2010/0017046 A1* | 1/2010 | Cheung | G01S 7/003 | 701/2 |
| 2010/0036549 A1* | 2/2010 | Kwan | B64D 1/16 | 701/7 |
| 2010/0042269 A1* | 2/2010 | Kokkeby | G01S 3/7864 | 701/3 |
| 2010/0070111 A1* | 3/2010 | Akcasu | A62C 3/025 | 701/3 |
| 2010/0228406 A1* | 9/2010 | Hamke | G05D 1/0038 | 701/3 |
| 2010/0264216 A1* | 10/2010 | Kenefic | F42B 15/01 | 235/400 |
| 2010/0286859 A1* | 11/2010 | Feigh | G05D 1/0044 | 701/25 |
| 2010/0305781 A1* | 12/2010 | Felix | G05D 1/101 | 701/3 |
| 2011/0026774 A1* | 2/2011 | Flohr | G08C 17/02 | 382/106 |
| 2011/0178658 A1* | 7/2011 | Kotaba | G01C 21/005 | 701/3 |
| 2012/0210853 A1* | 8/2012 | Abershitz | B64F 1/04 | 89/1.11 |
| 2012/0290154 A1* | 11/2012 | Lopez Leones | G08G 5/0021 | 701/3 |
| 2013/0124089 A1* | 5/2013 | Herman | G01C 21/20 | 701/528 |
| 2013/0234864 A1* | 9/2013 | Herman | G08G 1/00 | 340/901 |
| 2013/0293406 A1* | 11/2013 | Herman | F41H 3/00 | 342/20 |
| 2013/0297271 A1* | 11/2013 | Herman | G06Q 10/10 | 703/8 |
| 2013/0317670 A1* | 11/2013 | Magana Casado | G05D 1/101 | 701/3 |
| 2013/0317671 A1* | 11/2013 | Magana Casado | G05D 1/101 | 701/3 |
| 2013/0317672 A1* | 11/2013 | Magana Casado | G08G 5/0013 | 701/3 |
| 2013/0321626 A1* | 12/2013 | Finn | G01C 11/025 | 348/145 |
| 2013/0321635 A1* | 12/2013 | Finn | G01C 11/02 | 348/148 |
| 2014/0229094 A1* | 8/2014 | La Civita | G08G 5/0008 | 701/120 |
| 2014/0336932 A1* | 11/2014 | Leones | G08G 5/003 | 701/528 |
| 2015/0059564 A1* | 3/2015 | De Sa | F41H 13/00 | 89/1.11 |
| 2017/0021837 A1* | 1/2017 | Ebina | B60K 28/06 | |

OTHER PUBLICATIONS

7-Bit coded Character Set Standard ECMA-6, 6th Edition, published in Dec. 1991, reprinted in electronic form in Aug. 1997, 28 pages.

\* cited by examiner

SYSTEM AND METHOD FOR COMMANDING A PAYLOAD OF AN AIRCRAFT

CROSS REFERENCE TO RELATED APPLICATIONS

This application claims the benefit of EP Patent Application No. 13382486.2 entitled System and Method For Commanding a Payload of an Aircraft, filed on Nov. 29, 2013 in the Spanish Patent Office, the disclosure of which is incorporated herein by reference in its entirety.

BACKGROUND

The types of missions that an aircraft, and more specifically an unmanned air vehicle, can address and the type of goals that can be achieved depend on the performance and features of the aircraft involved in each mission. For example, a rotorcraft can perform confirmation missions hovering over a defined location where a threat has been identified, while a fixed-wing aircraft is more appropriate for surveillance missions over large areas.

However, missions are also constrained by the payload system, which restricts the aircraft performance and can be influenced by some vehicle limitations. The size, shape and configuration of the aircraft are paramount for establishing the payload to be installed onboard, and therefore, influence the types of missions that can be executed by the global system (equipped aircraft). The significant advances in payload capabilities during the past years represent a step forward in the "payload with persistence" direction towards the concept of autonomous UAVs. In this strategic vision the relevance of payload is nowadays the main bottleneck, so it is easy to find serious limitations about how to integrate some specific sensors or devices onboard.

The NATO Standardization Agreement STANAG 4586, under the control of the NATO Naval Armaments Group (NNAG), aims at standardizing the interoperability procedures for cooperative mission executed by a fleet of UAVs. This standard establishes separated levels of interoperability according to the type of mission, vehicles performances and payload capabilities. The payload has a very close relationship with the air vehicle, conditioning its nominal operation and strongly influencing the mission execution. Mission management is designed to control and monitor both the air vehicle operations and also the payload performances, considering the payload "as part" of the vehicle. This standard identifies five levels of interoperability (LOI) to accommodate operational requirements:

Level 1: Indirect receipt/transmission of UAV related data and metadata.
  Level 2: Direct receipt/transmission of UAV related data and metadata.
  Level 3: Control and monitoring of the UAV payload, not the unit.
  Level 4: Control and monitoring of the UAV without launch and recovery.
  Level 5: Control and monitoring of the UAV including launch and recovery.

The respective operational requirements and approved concept of operations (CONOPS) will determine or drive the required LOI that the specific UAV system will achieve. The STANAG 4586 defines payload and payload plan as:
  Payload: UAV sensor(s), weapons, chaff, pamphlets, onboard systems, etc., carried onboard which are used to accomplish a specified mission.
  Payload Plan: Details of the sensor to be used, or which sensors are to be loaded if multiple payloads are within the UAV capability. At specific points along a route there may be pre-planned sensor operations and the details of these have to be incorporated into the payload plan and associated with waypoints in the route. Available as hard copy for UAV payload loading and for display with or alongside the route plan, action cueing has to be incorporated either for the operator or the UAV depending on system sophistication. Payload planning may includes payload configuration (e.g., payload type and lens size), payload imagery extraction (e.g., desired resolution), and operator commands for controlling both EO/IR and SAR payloads (e.g., zoom settings, depression angle, and focus).

This standard defines a communication protocol to fulfill, defining different kinds of payloads and operations, in order to achieve interoperability of heterogeneous UAV systems.

Another approach to this problem is the Joint Architecture for Unmanned Systems (JAUS), formerly known as Joint Architecture for Unmanned Ground Systems (JAUGS), which was started in 1998 by the United States Department of Defense to develop an open architecture for the domain of unmanned systems. In order to ensure that the component architecture is applicable to the entire domain of current and future unmanned systems, it was built on five principles: vehicle platform independence, mission isolation, computer hardware independence, technology independence, and operator use independence. The JAUS reference architecture is a component based message passing architecture that defines a data format and methods of communication between computing nodes. The architecture dictates a hierarchical system built up of subsystems, nodes and components, and contains a strictly defined message set to support interoperability. Significant portions of the architecture, including the definitions for subsystem, node and component, have been loosely defined in order to accommodate for the five principles on which it is based.

BRIEF DESCRIPTION

The method herein disclosed provides a formal language that expresses the operations to be performed on the payload on-board a fleet of aircraft, and more particularly of UAVs, in order to achieve the goals of a mission. It can also be reused as a communication standard to remotely operate the on-board payload. The technical problem that this disclosure addresses is related to the control of onboard payload during mission execution. The payload has to be controlled along the mission based on certain commands for its configuration and operation along time.

The disclosure may provide a method that provides a description of the payload intent of an aircraft, also called PIDL. The description expresses the operations to be performed by the payload onboard in order to achieve the established mission goals.

The PIDL also enables the description of specific actions to be carried out by the payload in coordination with the aircraft trajectory, defining a plurality of second events (instant, location, etc., generally referred as a trigger) for a planned action, i.e. when to set the payload configuration according to the mission status. This capability solves the technical problem of how to coordinate the concepts of "payload mission" and "aircraft mission".

Hence, this coordination with the aircraft trajectory is achieved linking the PIDL to the Flight Intent Description Language (FIDL) described in U.S. patent application Ser.

No. 13/360,318, filed Jan. 27, 2012 and EP Patent Application Number 07380259.7, filed Sep. 21, 2007, which are both hereby incorporated by reference.

The method, assuming that the aircraft comprises at least one payload, comprises the following stages:
- receiving a plurality of trajectory events which comprise trajectory information of the aircraft;
- generating a plurality of payload commands using statements of payload intent; and,
- synchronizing each one of the payload commands with at least one of the plurality of trajectory events.

Payload Intent is a formal description of how a payload is to be operated to achieve the planned mission objectives. This basically encompasses the activation and deactivation periods, data gathering and storage in accordance with the payload features and data downloading via datalink.

In one embodiment of the method, the statement of payload intent comprises an operation statement and an execution interval.

In another embodiment of the method, the execution interval is defined by a beginning trigger and an end trigger.

In another embodiment of the method, the beginning trigger and the end trigger are further associated with at least one of the plurality of trajectory events, in such a way that the trajectory events determine the beginning and end triggers of the payload commands.

In another embodiment of the method, the statement of payload intent comprises a sequence of concatenated operation statements. The payload intent may further include one or more logical operations associated with a plurality of triggers associated with the payload intent.

In another embodiment of the method, the trajectory events are defined by the fulfillments of a condition on any aircraft state variables which may describe a relevant trajectory event. The aircraft state variables may be selected among a predefined instant, a predefined location, a predefined aircraft attitude or a combination thereof, but they are not limited to these.

The method herein disclosed can be implemented in unmanned air vehicles, UAVs.

The disclosure may also provide a system for commanding the payload of an aircraft that makes use of the method previously disclosed. Said system comprises means for receiving and processing events which comprise trajectory information of the aircraft. It further comprises:
- means for reading data and generating payload commands using statements of payload intent for commanding the payload of the aircraft; and,
- means for synchronizing each payload command with at least one of the events which comprise trajectory information of the aircraft.

In one embodiment of the system, the means for reading data providing payload commands are a payload computation engine and a database which stores payload performance models.

In another embodiment of the system, the inputs of the payload computation engine are the statements of payload intents and data performance of the performance model of the payloads.

In another embodiment of the disclosure, the aircraft is an unmanned air vehicle.

This disclosure provides a framework for controlling the payload in coordination with the performance of the platform, considering the mission objectives and how they can be achieved efficiently by the exploitation of the system capabilities, which gathers the vehicle performance, payload functionalities and mutual constraints (the vehicle maneuverability may be restricted due to the onboard payload, and those systems by the capabilities of the platform).

One of the advantages of the method herein disclosed is that the description of the payload intent that it provides is flexible enough to be extended for use by any current and future payload. The language provided by the method is not rigid, and therefore, allows including additional rules to describe the behavior of the systems onboard during a mission execution.

DETAILED DESCRIPTION

This description of the payload intent has been defined as a formal language, also called Payload Intent Description Language (PIDL), which establishes the lexical and grammatical rules required for generating well-formed sentences. The disclosure could be implemented for commanding the payloads of any kind of terrestrial, air or maritime vehicle, although it has been preferably foreseen as being used for aircrafts and more specifically for unmanned air vehicles (UAVs).

This Payload Intent Description Language is independent of the type of payload and the native interface provided by the payload system manufacturer. It aims at providing a way for communicating goals and objectives to the payload systems by means of a common interface which also enables the continuous coordination between the aircraft and the payload. Although payload systems and platforms have their own performances, the combination of a specific system with a concrete platform produces restrictions to the payload functionalities and vehicle capabilities. Thus, the method and system allows a description to be made of how to operate the payload according to the global system capabilities and the overall mission objectives.

The PIDL will contain the information required for the payload to execute the mission in coordination with the aircraft ensuring that the global mission goals can be accomplished according to the mission schedule (chronological order of individual mission objectives).

The method provides a common framework that could be used by any payload system onboard any platform by just a small adaptation of the inputs format. The disclosure allows the automatization and coordination of vehicle missions with payload missions and it also allows planning and monitoring the missions in a remote and easy way. Additionally the disclosure provides a global infrastructure for mission design and execution which is characterized by the flexibility of mission descriptions for heterogeneous platforms with different payloads, the robustness of mission monitoring by means of the accomplishments of individual payload goals (which requires a tight coordination with the platform behavior) and the easiness for a human to interface with the system regardless of its complexity.

Next, a description of one example of an embodiment of the disclosure is carried out, with illustrative character and without limitation, making reference to the numbering adopted in the figures.

The variety of payloads that can be installed on-board an UAV ranges from an optical or infrared camera with some degrees of freedom, to a simple gas sensor (see Table 1). According to the STANAG 4586, the payloads are UAV's sensor(s); weapons, chaff, pamphlets, onboard systems, etc. carried onboard which are used to accomplish a specified mission.

TABLE 1

Payload Types (acronyms according to STANAG 4586)

| Acronym | Payload |
|---------|---------|
| EO | Electro Optical Camera |
| IR | Infrared Camera |
| EO/IR | EO/IR Camera |
| SAR | Synthetic Aperture Radar |
| FC | Fixed-Camera |
| CR | Comms-Relay |
| DP | Dispensable-Payload |
| REC | Recorder |
| PBD | Payload-Bay-Door |
| VSM | Vehicle Specific Module |

The payload must be controlled along the mission based on certain commands for its configuration and operation. Hence this disclosure provides a description of the intent of the aircraft payload, which consists of a formal language called Payload Intent Description Language (PIDL) that expresses the operations to be performed on the payload on-board any air vehicle in order to achieve the goals of a mission. The PIDL describes specific actions to be carried out by the payload in coordination with the aircraft trajectory and includes the event which triggers certain actions, i.e. where to turn on the payload or when to set the payload configuration according to the mission status. An important feature of a PIDL is that it should be independent of the particular characteristics of the vehicle carrying the payload.

Figure 1:
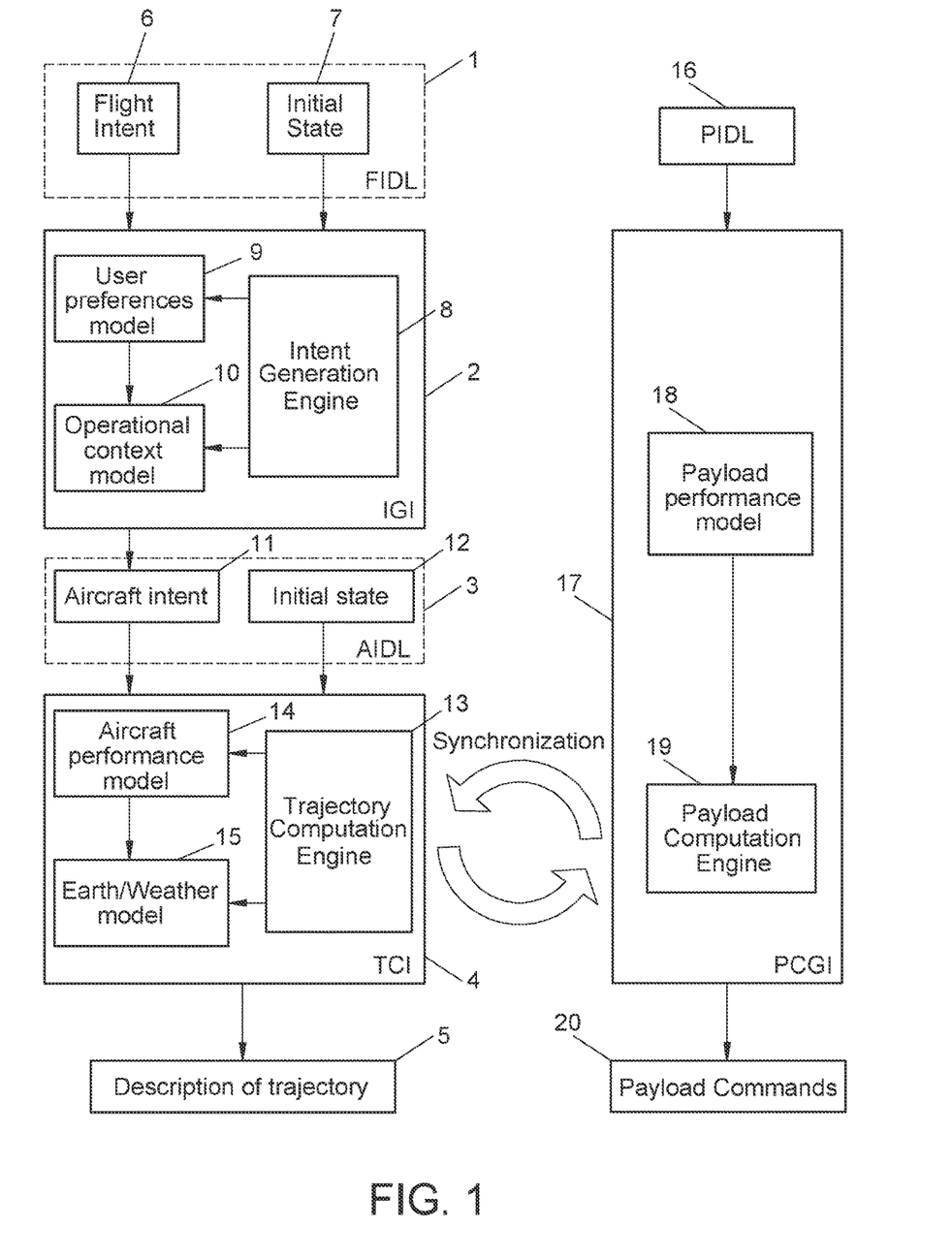
FIG. 1 shows a block diagram of an embodiment of the system for commanding the payload of an aircraft object of the disclosure.

Before proceeding with the description of the embodiments of the disclosure, the relation of the description of the payload intent with previous languages will be pointed out. FIG. 1 shows the architecture used to process a given PIDL and the relation with the architecture used to provide data for predicting aircraft trajectory previously disclosed in US Publication 2012-0290154, filed Jan. 27, 2012, which is hereby incorporated by reference. As it can be seen on the left side of FIG. 1, a Flight Intent Description Language (FIDL) (1) (disclosed in US 2012-0290154) is the input for the Intent Generation Infrastructure (IGI) (2) (disclosed in EP Patent Application 13382171, filed May 9, 2013 which is hereby incorporated by reference). More specifically the IGI (2) receives a description of the flight intent (6) with the initial state (7) of the aircraft. The IGI (2) comprises an intent generation engine (8), a first database (9) which comprises user preference models (preferred operational strategies that governs the aircraft) and a second database (10) which comprises an operational context model (constraints on use of airspace). The intent generation engine (8) provides an aircraft intent (11) as its output. The obtained aircraft intent (11) together with the initial state (12) of the aircraft conform the Aircraft Intent Description Language (AIDL) (3) (disclosed in EP Patent 2040137 which is hereby incorporated by reference) that is finally processed by the Trajectory Computation Infrastructure (TCI) (4) to produce the description of the trajectory (5) of the aircraft. The TCI (4) comprises a trajectory computation engine (13), an aircraft performance model (14) (aircraft performance aspects to integrate motion equations in the engine (8)) and an Earth/Weather model (15) (environmental conditions). The FIDL may endow constraints that come from the on-board payload characteristics, i.e. if it is a fixed camera used for border surveillance, the trajectory of the aircraft should allow the camera to have the border in its field of view during the flight.

On the right side of FIG. 1, a PIDL (16) is the input for the Payload Commands Generation Infrastructure (PCGI) (17) that computes the commands for the on-board payload in synchronization with the different segments of the trajectory computed by the TCI (4). The components of the PCGI (17) are:

Payload Computation Engine (19): it generates specific payload commands (20) using as input the different PIDL statements (16). It relies on the payload performance models (19) and the interactions with the TCI (4) in order to synchronize the payload commands with the trajectory of the aircraft.

Payload Performance Model (18): Formal models describing the characteristics of the payload, i.e. length of focus, restrictions to be used in some weather conditions, temperature range daylight, etc. It includes a database with the different payload Application Programming Interfaces (APIs) in order to allow the generation of the proper commands for each payload.

The main technical features of the Payload Intent Description Language herein described are:

PIDL Alphabet

As other human oriented formal or programming languages (as C, C++, JAVA), the PIDL alphabet is composed by the ISO/IEC 646:1991 Standard, or its equivalent 7-Bit coded Character Set Standard ECMA-6, 6th Edition, published in December 1991, herein incorporated by reference.

PIDL Grammar Rules

Grammar rules describe which of the possible sequences of symbols or letters belonging to the associated alphabet in a language constitute valid strings or words in that language and how to combine these words to generate valid sentences. The grammar rules specify which strings of symbols count as well-formed and then, which belong to the language. These rules are usually recursive, some rules postulate which expressions belong to the language in question and some other rules establish how to build well-formed expressions from other expressions belonging to the language.

The PIDL grammar is divided into lexical and syntactical rules. The former contains a set of rules that govern the creation of valid words using the PIDL alphabet. The latter contains a set of rules for the generation of valid PIDL sentences that correspond with the type of sentences already described. Both of them are defined using Extended Backus-Naur Form (EBNF), a family of metasyntax notations used for expressing context-free grammars.

The PIDL lexical rules contain a set of rules that govern the creation of valid words using the PIDL alphabet. The PIDL lexical rules allow generating the words of the language.

Figure 2:
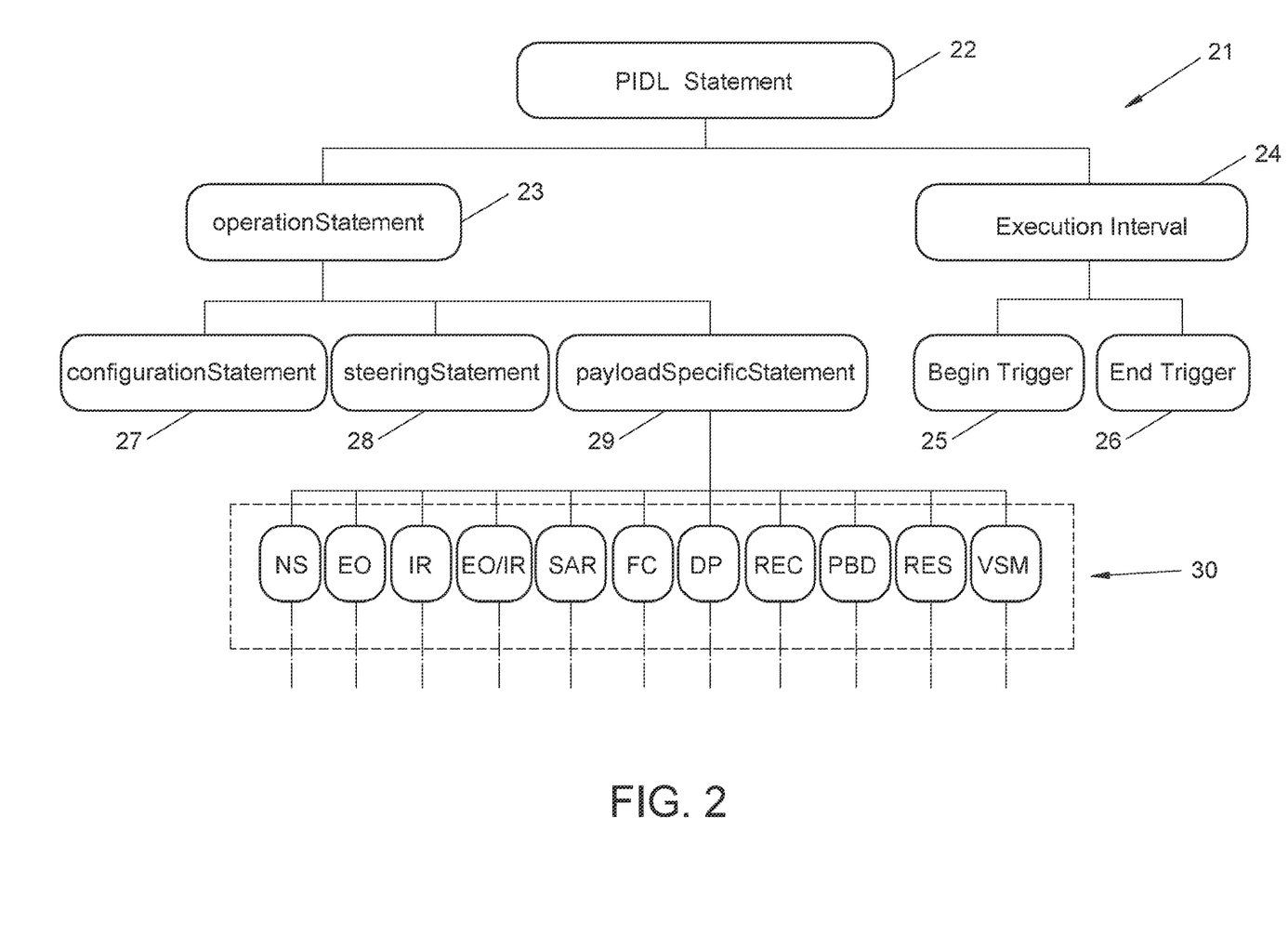
FIG. 2 shows a block diagram of an embodiment of the statements hierarchy that govern the PIDL grammar rules object of the disclosure.

The PIDL syntactical rules contains a set of rules for the generation of valid PIDL sentences that correspond with the type of sentences already described. Basically, these rules are used to identify PIDL valid words (defined by the lexical rules of the grammar) and keywords and if a sentence composed by PIDL words is valid or not. The valid PIDL sentences (21) are shown in FIG. 2 and match the previously explained requirements of the language. The hierarchy starts with a PIDL statement (22) which is equivalent to the so-called Command Payload Segment (CPS). A PIDL statement (22) is composed by the operation statement (23) and the execution interval (24) which is defined by the beginning (25) and the end trigger (26).

Operation Statements

A PIDL statement (22) or CPS can be composed by a sequence of concatenated operation statements (23) that represent a chronological succession of payload commands to be executed. Operation statements definition can be derived from STANAG 4586 information fields for communication messages involving payloads. Three types of statements have been considered:

Configuration statements (27): common configuration operations applicable to any payload. It describes the payload configuration.

Steering operations statements (28): specific statements applicable only to a steerable payload based on pan and tilt devices. It describes how to command the payload.

Specific commands statements (29): it describes the technical features for each particular payload type (30) (NS: Not Specified, EO: Electro Optical Camera, IR: Infra-red Camera, EO/IR:EO/IR Camera, SAR: Synthetic Aperture Radar, FC: Fixed-Camera, DP: Dispensable-Payload, REC: Recorder, PBD: Payload-Bay-Door, RES: Reserved ,VSM: Vehicle Specific Module).

In turn, each configuration statement comprises a set of labels that describe the configuration of the payload. These labels might be: turning on and turning off of the system, turning on and turning off of the device, initialization, activating, calibrating, caging, stowing, reserving or deploying of the payload.

Each steering operations statement comprises a set of labels that describe how to command the payload. These labels might be: setting centerline azimuth angle or centerline elevation angle, setting azimuth angle or azimuth offset, setting elevation angle or elevation offset, setting zoom, setting horizontal field of view or vertical field of view, setting horizontal slew rate or vertical slew rate, latitude, longitude, altitude and altitude type, setting focus and focus type.

Each payload specific statement comprises a set of labels that describe technical features for each particular payload. These labels will be different depending on the particular payload installed onboard.

Execution Interval

Figure 3:
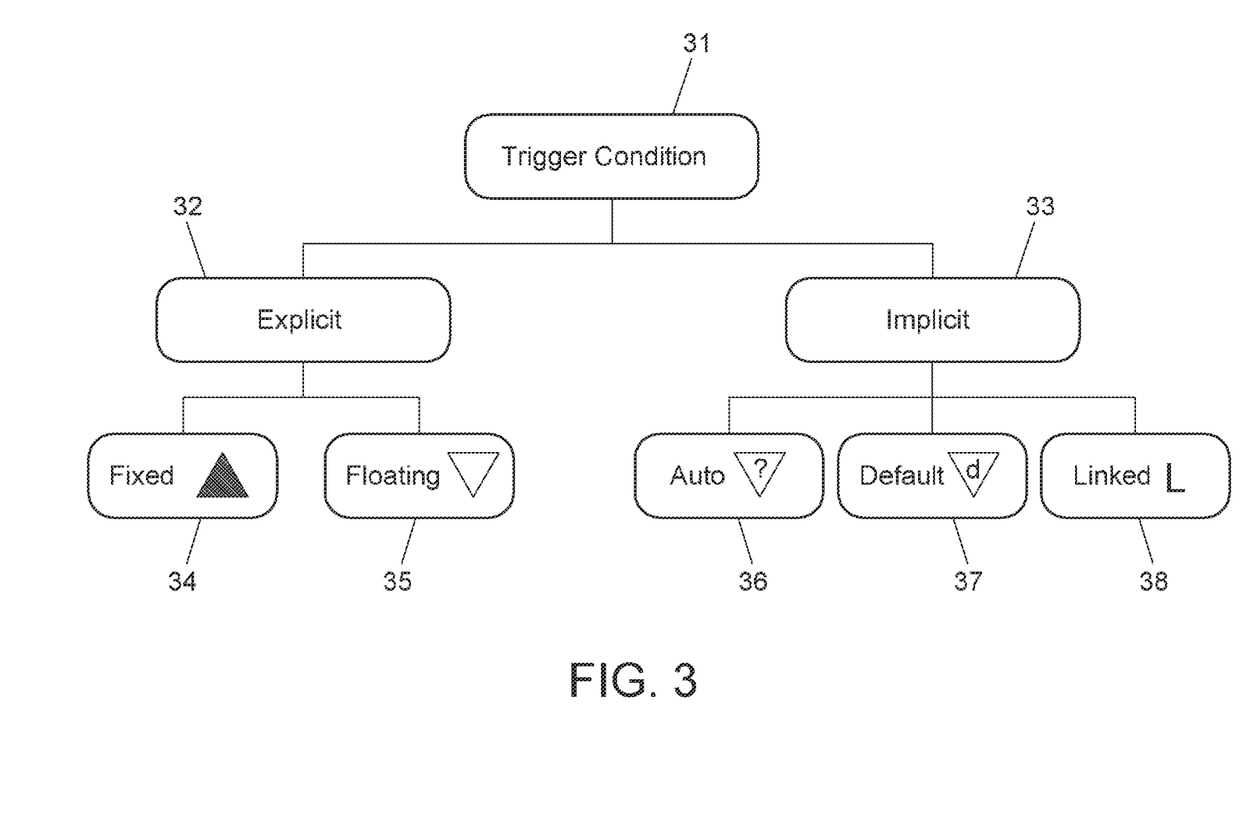
FIG. 3 shows a block digram of the different types of trigger conditions that define the execution intervals of the PIDL statements.

The execution interval defines the interval of the CPS by initial and end triggers that may be defined for each flight segment of the aircraft with the payload on-board or defined for any other aircraft state variable. FIG. 3 shows the different forms adopted by the trigger conditions (31), specifically, explicit triggers (32) and implicit triggers (33). Explicit triggers (32) are divided into fixed (34) and floating triggers (35). Implicit triggers (33) are divided into linked triggers (38), auto triggers (36) and default triggers (37). Starting with the explicit triggers (32), a fixed trigger (34) refers to a specified time instant for starting or ending an execution interval. A floating trigger (35) depends upon an aircraft state variable such as speed or altitude reaching a certain value to cause an execution interval to start or end. Turning now to implicit triggers (33), a linked trigger (38) is specified by reference to another flight segment. In this way, a series of triggers may create a logically ordered sequence of flight segments where the chain of start triggers is dependent upon the end trigger of a previous flight segment. Auto triggers (36) delegate responsibility for determining whether the conditions have been met to the trajectory computation engine. Such an arrangement is needed when the conditions are not known at the intent generation time, and will only become apparent at the trajectory computation time. Default triggers (37) represent conditions that are not known at intent generation, but are determined at trajectory computation because they rely upon reference to the aircraft performance model. Trigger conditions can be combined by means of logical AND and OR operators to create more complex conditions, but the complete trigger maintains its Boolean character. These operators allow the creation of complex triggers that group multiple activation/deactivation conditions, so that certain switching logic can be inserted in the PIDL sentence.

Figure 4:
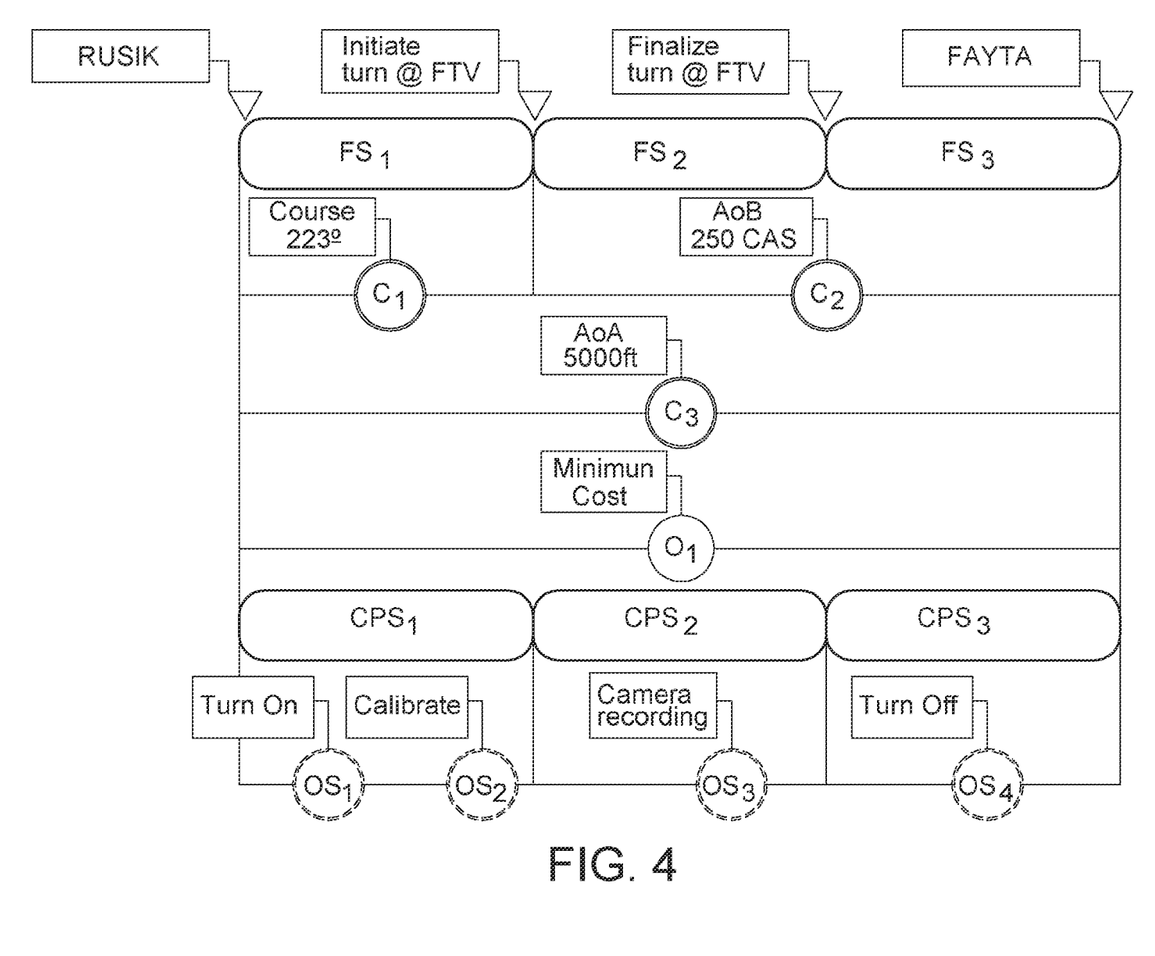
FIG. 4 shows an embodiment for a flight intent described using flight intent description language elements and payload intent description language elements.

FIG. 4 shows a high level overview of a Flight Intent (FI) with its corresponding flight and command payload segments, i.e., a graphical representation of a combination of a FIDL sequence and its corresponding PIDL sequence. This example is an extension of the FIDL sequence example used in U.S. patent application Ser. No. 13/360,318, filed Jan. 27, 2012, which is hereby incorporated by reference. The figure represents the intention of flying from waypoint RUSIK to waypoint FAYTA, performing a turn at waypoint FTV. This flight is used to perform a surveillance operation with the camera on-board. The sequence is composed by the following elements:

Flight Segments (FS):
    FS1 comprised between the initial state defined by the waypoint RUSIK and the final state defined by the beginning of the turn maneuver at waypoint FTV.
    FS2 comprised between the initial state defined by the beginning of the turn maneuver at waypoint FTV and the final state defined by the end of the turn maneuver at waypoint FTV.
    FS3 comprised between the initial state defined by the end of the turn maneuver at waypoint FTV and the final state defined by the waypoint FAYTA.
Constraints (C): Constraints are rules or restrictions that may limit the trajectory to be flown by the aircraft, which can be self-imposed, by the aircraft operator, by the operational context or by air traffic control (ATC):
    C2, lateral restriction of maintaining course 223°.
    C2, speed restriction of flying at or below (AoB) 250 CAS.
    C3, altitude restriction of flying at or above (AoA) 5000 ft.
Objectives (0): represents a wish to affect the aircraft's motion to optimize a certain objective functional over a certain domain of application:
    O1, minimum cost.

Combining these three elements it is possible to create valid FIDL strings. Following this, a set of PIDL statements of an on-board camera are defined:

Command Payload Segments (CPS) or PIDL statement:
    CPS1
        OS1: command to turn on the on-board camera.
        OS2: command to calibrate the camera.
    CPS2
        OS3: command to perform the corresponding surveillance.
    CPS3
        OS4: command to finally turn off the payload.

FIG. 4 shows how a first flight segment (FS1) corresponds to a first command Payload Segment (CPS1). Both of these are defined for the same begin and end triggers. During the execution of the CPS1 the on-board camera will turn on (OS1) and calibrate (OS2) and the aircraft will be laterally restricted to maintain a course 223°. During the execution of the second flight segment (FS2), to which corresponds a second Command Payload Segment (CPS2), the on-board camera will start recording and the aircraft maintaining the mentioned lateral restriction, will reach the 5000 ft. During the execution of the third flight segment (FS3), to which corresponds a third Command Payload Segment (CPS3), the speed of the aircraft is at or below 250 CAS and the on-board camera will turn off.

The example herein disclosed is a simplification of a real situation. A real mission will involve a plurality of objectives, payloads, flight segments, constraints, and command payload segments that would be combined and synchronized by means of the method and system herein disclosed in order to achieve the mission goals.

PIDL can completely and unambiguously define the commands for the on-board payload in a formal manner taking into account also the aircraft trajectories.

It may incorporate STANAGs (or other standards) in order to evolve to new types of payload, devices, requirements, etc.

The PIDL provides direct coordination between the commands for the payload and the UAVs trajectories. It can be integrated into any Mission Management System or Ground Control Station.

PIDL provides a language with a syntax that makes it suitable to human reading and it implies an extra support or added value for human designers and supervisors of missions.

This language provides an efficient framework for integrating heterogeneous payloads in autonomous vehicles seamlessly with the capability of efficient mission design, execution and monitoring. Currently, there is no other option than controlling the payload by means of the interface provided by the manufacturer. However, this does not allow a robust mission management, due to the possible interoperability dysfunction during the execution between the platform and payload due to the lack of a common mechanism for sharing the mission goals.

The description of the different advantageous implementations has been presented for purposes of illustration and description, and is not intended to be exhaustive or limited to the implementations in the form disclosed. Many modifications and variations will be apparent to those of ordinary skill in the art. Further, different advantageous implementations may provide different advantages as compared to other advantageous implementations. The implementation or implementations selected are chosen and described in order to best explain the principles of the implementations, the practical application, and to enable others of ordinary skill in the art to understand the disclosure for various implementations with various modifications as are suited to the particular use contemplated. This written description uses examples to disclose various implementations, which include the best mode, to enable any person skilled in the art to practice those implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for commanding a payload of an aircraft, the method comprising:
   receiving a plurality of trajectory events which comprise trajectory information of the aircraft;
   generating and storing a plurality of payload commands using one or more statements of payload intent,
      wherein the statements of payload intent are described using a first formal language comprising an alphabet and a plurality of lexical and syntactical rules,
      wherein the first formal language is independent of payload type,
      wherein the statements of payload intent comprises an operation statement and an execution interval, and
      wherein the execution interval is defined by a beginning trigger relating to activation for the operation statement and an end trigger relating to deactivation for the operation statement; and
   synchronizing each one of the stored payload commands with at least one of the plurality of trajectory events, wherein the beginning trigger and the end trigger are further associated with at least one of the plurality of trajectory events.

2. The method according to claim 1, wherein at least one of the statements of payload intent comprises a sequence of concatenated operation statements.

3. The method according to claim 1, wherein the statements of payload intent further comprises one or more logical operations associated with a plurality of triggers associated with the payload intent.

4. The method according to claim 1, wherein at least one of the plurality of trajectory events are defined by a value of one or more aircraft state variables and wherein the aircraft state variables are selected among a predefined instant, a predefined location, a predefined attitude of the aircraft or a combination thereof.

5. The method according to claim 1, wherein the aircraft is an unmanned air vehicle.

6. A system for commanding a payload of an aircraft, the system comprising:
   means for receiving and processing trajectory events which comprise trajectory information of the aircraft;
   means for reading data and generating payload commands using one or more statements of payload intent for commanding the payload of the aircraft,
      wherein the statements of payload intent are described using a first formal language comprising an alphabet and a plurality of lexical and syntactical rules,
      wherein the first formal language is independent of payload type,
      wherein the statements of payload intent comprises an operation statement and an execution interval, and
      wherein the execution interval is defined by a beginning trigger relating to activation for the operation statement and an end trigger relating to deactivation for the operation statement; and,
   means for synchronizing each payload command with at least one of the plurality of trajectory events of the aircraft, wherein the beginning trigger and the end trigger are further associated with at least one of the plurality of trajectory events.

7. The system according to claim 6, wherein the means for reading data and generating payload commands comprise a payload computation engine and a database which stores payload performance models and wherein the inputs of the payload computation engine comprise the statements of payload intents and data performance of the performance model of the payloads.

8. The system according to claim 6, wherein at least one of the statements of payload intent comprises a sequence of concatenated operation statements.

9. The system according to claim 6, wherein the statements of payload intent further comprises one or more logical operations associated with a plurality of triggers associated with the payload intent.

10. The system according to claim 6, wherein at least one of the plurality of trajectory events are defined by a value of one or more aircraft state variables.

11. The system according to claim 10, wherein the aircraft state variables are selected among a predefined instant, a predefined location, a predefined attitude of the aircraft or a combination thereof.

12. The system according to claim 6, wherein the aircraft is an unmanned air vehicle.

13. A system for commanding a payload of an aircraft, the method comprising:
a trajectory computation infrastructure operable to generate a plurality of trajectory events which comprise trajectory information of the aircraft;
a payload intent description language (PIDL) data structure storing PIDL statements;
a payload commands generation infrastructure operable to:
generate a plurality of payload commands using one or more PIDL statements of payload intent,
wherein the statements of payload intent are described using a first formal language comprising an alphabet and a plurality of lexical and syntactical rules,
wherein the first formal language is independent of payload type,
wherein the statements of payload intent comprises an operation statement and an execution interval, and
wherein the execution interval is defined by a beginning trigger relating to activation for the operation statement and an end trigger relating to deactivation for the operation statement; and
synchronize each one of the payload commands with at least one of the plurality of trajectory events, wherein the beginning trigger and the end trigger are further associated with at least one of the plurality of trajectory events.

14. The system according to claim 13, wherein at least one of the statements of payload intent comprises a sequence of concatenated operation statements.

15. The system according to claim 13, wherein the statements of payload intent further comprises one or more logical operations associated with a plurality of triggers associated with the payload intent.

16. The method according to claim 13, wherein at least one of the plurality of trajectory events are defined by a value of one or more aircraft state variables and wherein the aircraft state variables are selected among a predefined instant, a predefined location, a predefined attitude of the aircraft or a combination thereof.

17. The method according to claim 1, wherein the operation statement comprises at least one of a command or a configuration for operation of the payload, and wherein the beginning trigger relates to activation of the command or configuration and the end trigger relates to deactivation of the command or configuration.

18. The method according to claim 1, wherein the beginning trigger is an explicit trigger comprising at least one of a fixed trigger or a floating trigger.

19. The method according to claim 1, wherein the beginning trigger is an implicit trigger comprising at least one of: (i) a linked trigger for a first flight segment relating to a second flight segment, (ii) an auto trigger determined based on a trajectory computation, or (iii) a default trigger relating to a performance model for the aircraft.

20. The method of claim 1, wherein the payload comprises a native interface provided by a system manufacturer and wherein the first formal language is independent of the native interface.

* * * * *